(12) United States Patent
Le

(10) Patent No.: US 10,524,487 B2
(45) Date of Patent: *Jan. 7, 2020

(54) ANIMAL FEED STOCK USING MICROBIAL ENHANCEMENT

(71) Applicant: Khanh Le, San Jose, CA (US)

(72) Inventor: Khanh Le, San Jose, CA (US)

(73) Assignee: Cisbay, San Jose, CA (US)

(*) Notice: Subject to any disclaimer, the term of this patent is extended or adjusted under 35 U.S.C. 154(b) by 394 days.

This patent is subject to a terminal disclaimer.

(21) Appl. No.: 15/405,247

(22) Filed: Jan. 12, 2017

(65) Prior Publication Data

US 2018/0192668 A1 Jul. 12, 2018

(51) Int. Cl.
| | | |
|---|---|---|
| A23K 10/18 | (2016.01) | |
| A23K 50/00 | (2016.01) | |
| A23K 50/75 | (2016.01) | |
| A23K 50/30 | (2016.01) | |
| A23K 50/80 | (2016.01) | |

(52) U.S. Cl.
CPC ............ *A23K 10/18* (2016.05); *A23K 50/00* (2016.05); *A23K 50/30* (2016.05); *A23K 50/75* (2016.05); *A23K 50/80* (2016.05); *Y02A 40/818* (2018.01)

(58) Field of Classification Search
CPC .. C05F 11/08; C05F 11/02; C05F 3/00; C05F 11/00; C05F 17/0045; C05F 17/009; C05F 9/04; A23K 10/18; A23K 10/37; A23K 20/24; A23K 50/00; A23K 50/10; A23K 50/30; A23K 50/75; A23K 50/80; A23K 50/60; A23K 20/10; A23K 20/163; A23K 50/90; A23K 10/30; A23K 40/10; A23K 50/20; A23K 20/142; A23K 20/158; A23K 20/174; A23K 20/189; A23K 20/30; A23K 40/00; A23K 40/30; A23K 20/147; A23K 30/00; A23K 50/40; C05G 3/0064; C05G 3/00; C05G 3/0005; C05G 3/0047; C05G 3/0052; C05G 3/0076; C05G 3/04; C05G 3/0058; C01B 32/05; C05D 9/00; C05D 1/00; C05D 3/00; C05D 9/02; C09K 17/02; C09K 17/04; C09K 17/40; C09K 17/48; C09K 17/50; C09K 17/00; C10B 53/02; C10B 57/02; Y02E 50/14; Y02E 50/32; Y02E 50/343; Y02P 20/145; Y02P 60/218; Y10S 71/903; A01N 25/08; A01N 63/00; C05B 17/00; C05B 17/02; C05C 11/00; C05C 1/00; C05C 3/00; C05C 5/00; C05C 5/04; C05C 9/00; C12N 11/12; C12N 1/14; C12N 1/16; C12N 1/20; Y02A 40/818; Y02A 50/473; Y02A 50/401; Y02A 50/414; Y02A 40/216; Y02A 40/229; Y02A 50/402; Y02A 50/469; Y02A 50/475; Y02A 50/478; Y02A 50/48; Y02A 50/481; Y02A 50/49; A61L 9/012; A61L 9/014; A61L 2/07; A61L 2/18; A61L 2/22; A61K 33/44; A61K 9/1611; A61K 9/1682; A61K 9/1652; A61K 35/74; A61K 35/741; A61K 35/742; A61K 35/744; A61K 35/745; A61K 35/747; A61K 47/02; A61K 9/0053; A61K 9/0056; A61K 9/167; A61K 9/5036; A61K 2035/115; A61K 31/7004; A61K 31/7016; A61K 31/715; A61K 35/39; A61K 38/46; A61K 9/0031; A61K 9/19; A61K 35/37; A61K 45/06; A61K 9/48; A61K 9/4816; B01J 20/12; B01J 20/20; B01J 20/24; B01J 20/28019; B01J 20/3007; B01J 20/3028; B01J 20/3042; B01J 20/3078; B01J 2/00; B01J 2/28; B01J 2/12; Y02W 30/43; Y02W 30/47; Y02C 10/08

See application file for complete search history.

(56) References Cited

U.S. PATENT DOCUMENTS

| | | | |
|---|---|---|---|
| 3,719,327 A | 3/1973 | McMahan | |
| 4,551,164 A * | 11/1985 | Tenzer | C05F 11/08 71/6 |
| 6,471,741 B1 | 10/2002 | Reinbergen | |
| 10,118,870 B2 * | 11/2018 | Bontchev | C05D 9/00 |
| 10,173,937 B2 * | 1/2019 | Belcher | C05F 11/02 |
| 2005/0287283 A1 | 12/2005 | Dicks | |
| 2008/0213865 A1 | 9/2008 | Lai | |
| 2011/0281725 A1 | 11/2011 | Pullen | |
| 2013/0330308 A1 * | 12/2013 | Millan | C12N 1/20 424/93.41 |
| 2014/0234524 A1 | 8/2014 | Parks | |
| 2016/0368831 A1 * | 12/2016 | Bontchev | C05F 11/02 |
| 2017/0334797 A1 * | 11/2017 | Belcher | A01N 25/08 |
| 2017/0362135 A1 * | 12/2017 | Malyala | C05B 17/00 |
| 2018/0312448 A1 * | 11/2018 | Le | C05F 3/00 |

OTHER PUBLICATIONS

Best et al, J. of Mammalogy, "Facultative Geophagy at natural licks in an Australian Marsupial", 94(6): pp. 1237-1247, 2013.*
Govender et al, Rev. of the Adv. In Probiotic Delivery: Conventional vs. Non-conventional Formulation for Intestinal Floro Supplementation, AAPS PharmaSciTech, vol. 15, No. 1, pp. 29-43, Feb. 2014.*
Yirga, J. of Probiotic and Health, School of Animal and Range Science, Rev . . . Open Access: "The Use of Probiotic in Animal Nutrition", pp. 1-14, Aug. 2015.*

* cited by examiner

Primary Examiner — Deborah K Ware
(74) Attorney, Agent, or Firm — Tran & Associates

(57) ABSTRACT

In one aspect, a method for feeding animals includes selecting a plurality of strains of sporulated living microbes and form a microbial solution; and applying the microbial solution to a carrier. In another aspect during use, the method includes feeding animals with the microbial infused carrier to deliver microbes to a gastrointestinal tract alive; and germinating the microbes in the digestive tract and stimulating local intestinal immunity with the microbes.

8 Claims, 3 Drawing Sheets

FIG. 1

| |
|---|
| Select a plurality of strains of sporulated living microbes and form a microbial solution (12); |
| Mix a carrier such as almond hulls or shells with the microbial solution (14); |
| Feed animals with the microbial infused carrier (16) |
| Microbes reaches gastrointestinal tract alive (18) |
| Germinate in upper digestive tract (20) |
| Stimulate local intestinal immunity (22) |

ANIMAL FEED STOCK USING MICROBIAL ENHANCEMENT

This application is related to application Ser. No. 15/404,202 entitled "MICROBIAL SOIL ENHANCEMENTS" and Ser. No. 15/404,208 entitled "SYSTEMS AND METHODS FOR WATER REMEDIATION", now U.S. Pat. No. 10,179,744, all of which are filed concurrently herewith, and the contents of which are incorporated-by-reference.

BACKGROUND

The present invention relates to microbial enhancements for animal feeds.

World demand for animals and animal products is tremendous and continually growing. The U.S. cattle and dairy industries alone are billion dollar industries. They involve millions of head of cattle that consume billions of dollars of feed annually.

Today's farm animals nutrition are well understood base on essential needs of micro ingredients such as vitamins and minerals premixed into "compound feed" which include corn, soybeans, sorghum, oats, and barley, in addition with chemical preservatives and antibiotics.

The use of antibiotics in animal feeds may lead to some of those drugs that may pass into meat, milk, eggs and other products with toxins that are harmful to humans. In the last few years probiotics have constantly increased in importance and aroused growing interest in animal nutrition.

SUMMARY OF THE INVENTION

In one aspect, a method for feeding animals includes selecting a plurality of strains of sporulated living microbes and form a microbial solution; and infusing a carrier with the microbial solution. In another aspect during use, the method includes feeding animals with the microbial infused carrier to deliver microbes to a gastrointestinal tract alive; and germinating the microbes in the digestive tract and stimulating local intestinal immunity with the microbes.

In a further aspect, a method for feeding animals includes selecting a plurality of strains of sporulated living microbes and form a microbial solution; infusing a carrier such as hulls or shells with the microbial solution; feeding animals with the microbial infused carrier and delivering microbes to a gastrointestinal tract alive; and germinating the microbes in the digestive tract and stimulating local intestinal immunity with the microbes.

In yet another aspect, a method for feeding animals includes selecting a plurality of strains of sporulated living microbes and form a microbial solution; selecting as a carrier for a predetermined animal:
for grazing animal, one of hull, wheat, and dendritic salt,
for poultry, dendritic salt or calcium carbonate,
for aquatic animal, dendritic salt;
for swine, dendritic salt or calcium carbonate.
The microbial solution is then applied to the carrier.

Implementations of the above aspects may include one or more of the following. The microbes can be selected from Bacillus (B.) acidiceler, B. acidicola, B. acidiproducens, B. acidocaldarius, B. acidoterrestrisr, B. aeolius, B. aerius, B. aerophilus, B. agaradhaerens, B. agri, B. aidingensis, B. akibai, B. alcalophilus, B. algicola, B. alginolyticus, B. alkalidiazotrophicus, B. alkalinitrilicus, B. alkalisediminis, B. alkalitelluris, B. altitudinis, B. alveayuensis, B. alvei, B. amyloliquefaciens, B. a. subsp. amyloliquefaciens, B. a. subsp. plantarum, B. amylolyticus, B. andreesenii, B. aneurinilyticus, B. anthracis, B. aquimaris, B. arenosi, B. arseniciselenatis, B. arsenicus, B. aurantiacus, B. arvi, B. aryabhattai, B. asahii, B. atrophaeus, B. axarquiensis, B. azotofixans, B. azotoformans, B. badius, B. barbaricus, B. bataviensis, B. beijingensis, B. benzoevorans, B. beringensis, B. berkeleyi, B. beveridgei, B. bogoriensis, B. boroniphilus, B. borstelensis, B. brevis Migula, B. butanolivorans, B. canaveralius, B. carboniphilus, B. cecembensis, B. cellulosilyticus, B. centrosporus, B. cereus, B. chagannorensis, B. chitinolyticus, B. chondroitinus, B. choshinensis, B. chungangensis, B. cibi, B. circulans, B. clarkii, B. clausii, B. coagulans, B. coahuilensis, B. cohnii, B. composti, B. curdlanolyticus, B. cycloheptanicus, B. cytotoxicus, B. daliensis, B. decisifrondis, B. decolorationis, B. deserti, B. dipsosauri, B. drentensis, B. edaphicus, B. ehimensis, B. eiseniae, B. enclensis, B. endophyticus, B. endoradicis, B. farraginis, B. fastidiosus, B. fengqiuensis, B. firmus, B. flexus, B. foraminis, B. fordii, B. formosus, B. fortis, B. fumarioli, B. funiculus, B. fusiformis, B. galactophilus, B. galactosidilyticus, B. galliciensis, B. gelatini, B. gibsonii, B. ginsengi, B. ginsengihumi, B. ginsengisoli, B. globisporus, B. g. subsp. globisporus, B. g. subsp. marinus, B. glucanolyticus, B. gordonae, B. gottheilii, B. graminis, B. halmapalus, B. haloalkaliphilus, B. halochares, B. halodenitrificans, B. halodurans, B. halophilus, B. halosaccharovorans, B. hemicellulosilyticus, B. hemicentroti, B. herbersteinensis, B. horikoshii, B. horneckiae, B. horti, B. huizhouensis, B. humi, B. hwajinpoensis, B. idriensis, B. indicus, B. infantis, B. infernus, B. insolitus, B. invictae, B. iranensis, B. isabeliae, B. isronensis, B. jeotgali, B. kaustophilus, B. kobensis, B. kochii, B. kokeshiiformis, B. koreensis, B. korlensis, B. kribbensis, B. krulwichiae, B. laevolacticus, B. larvae, B. laterosporus, B. lautus, B. lehensis, B. lentimorbus, B. lentus, B. licheniformis, B. ligniniphilus, B. litoralis, B. locisalis, B. luciferensis, B. luteolus, B. luteus, B. macauensis, B. macerans, B. macquariensis, B. macyae, B. malacitensis, B. mannanilyticus, B. marisflavi, B. marismortui, B. marmarensis, B. massiliensis, B. megaterium, B. mesonae, B. methanolicus, B. methylotrophicus, B. migulanus, B. mojavensis, B. mucilaginosus, B. muralis, B. murimartini, B. mycoides, B. naganoensis, B. nanhaiensis, B. nanhaiisediminis, B. nealsonii, B. neidei, B. neizhouensis, B. niabensis, B. niacini, B. novalis, B. oceanisediminis, B. odysseyi, B. okhensis, B. okuhidensis, B. oleronius, B. oryzaecorticis, B. oshimensis, B. pabuli, B. pakistanensis, B. pallidus, B. pallidus, B. panacisoli, B. panaciterrae, B. pantothenticus, B. parabrevis, B. paraflexus, B. pasteurii, B. patagoniensis, B. peoriae, B. persepolensis, B. persicus, B. pervagus, B. plakortidis, B. pocheonensis, B. polygoni, B. polymyxa, B. popilliae, B. pseudalcalophilus, B. pseudofirmus, B. pseudomycoides, B. psychrodurans, B. psychrophilus, B. psychrosaccharolyticus, B. psychrotolerans, B. pulvifaciens, B. pumilus, B. purgationiresistens, B. pycnus, B. qingdaonensis, B. qingshengii, B. reuszeri, B. rhizosphaerae, B. rigui, B. ruris, B. safensis, B. salarius, B. salexigens, B. saliphilus, B. schlegelii, B. sediminis, B. selenatarsenatis, B. selenitireducens, B. seohaeanensis, B. shacheensis, B. shackletonii, B. siamensis, B. silvestris, B. simplex, B. siralis, B. smithii, B. soli, B. solimangrovi, B. solisalsi, B. songklensis, B. sonorensis, B. sphaericus, B. sporothermodurans, B. stearothermophilus, B. stratosphericus, B. subterraneus, B. subtilis, B. s. subsp. inaquosorum, B. s. subsp. spizizenii, B. s. subsp. subtilis, B. taeanensis, B. tequilensis, B. thermantarcticus, B. thermoaerophilus, B. thermoamylovorans, B. thermocatenulatus, B. thermocloacae, B. thermocopriae, B. thermodenitrificans, B. thermoglucosidasius, B. thermolactis, B. thermoleovorans, B. thermophilus, B. thermoruber, B. thermosphaericus, B. thiaminolyticus, B. thioparans, B. thuringiensis, B. tianshenii, B. trypoxylicola, B. tusciae, B. validus, B. vallismortis, B. vedderi, B. velezensis,

*B. vietnamensis, B. vireti, B. vulcani, B. wakoensis, B. weihenstephanensis, B. xiamenensis, B. xiaoxiensis,* and *B. zhanjiangensis.*

Advantages of the solutions may include one or more of the following. One embodiment called PROBIOFEED provides a natural and unique blend of specifically selected beneficial bacteria & probiotic additives to promote well-being of animals by preventing bacteria and parasitic contamination. Beneficial bacteria are essential to all life, PROBIOFEED will enhance the animals immunity, improving digestibility, improve intestinal health, increase animal survival rate and resistance to bad pathogen and diseases. More importantly, PROBIOFEED promotes animal growth and feed efficiency, which will add to a farmer's bottom line.

These and other advantages are achieved by the present invention, which provides a method of preserving and solutions containing microbial spores and/or colonies.

BRIEF DESCRIPTION OF THE FIGURES

FIG. 1 shows an exemplary process to infuse hulls or shells with microbials for feeding animals.

DETAILED DESCRIPTION OF THE INVENTION

Figure 2A:
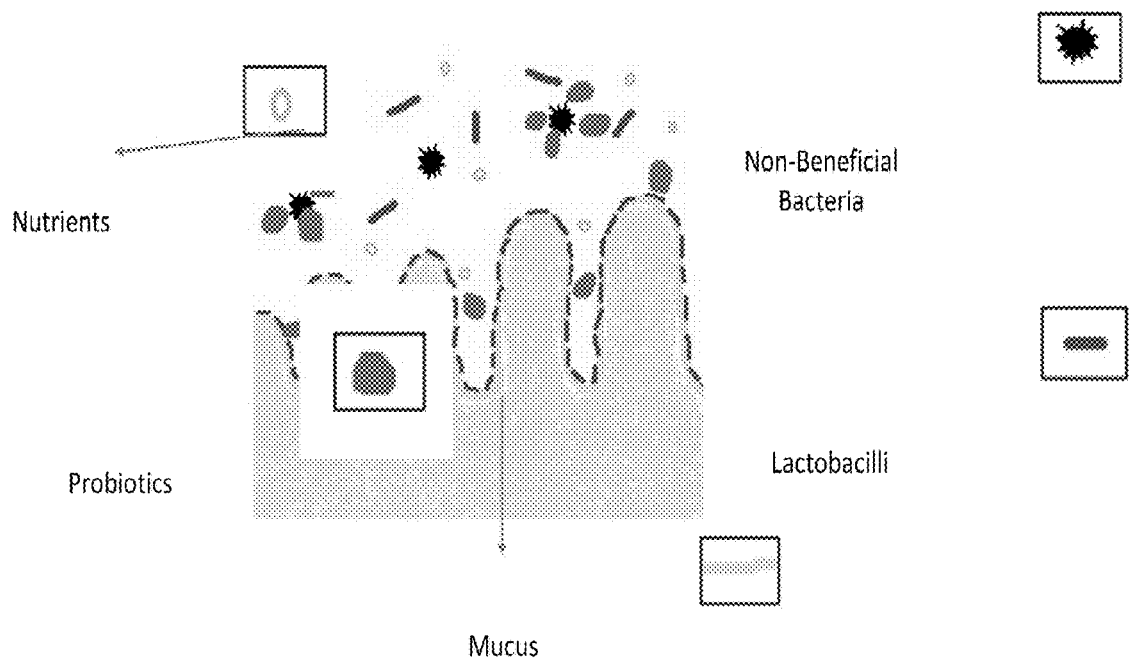
FIG. 2A shows an exemplary digestive tract with nutrients, non-beneficial bacteria, lactobacilli and probiotics.

FIG. 1 shows an exemplary process to infuse hulls or shells with microbials for feeding animals. The process includes:
- Select a plurality of strains of sporulated living microbes and form a microbial solution (12);
- Infuse a carrier such as hulls or shells with the microbial solution (14);
- Feed animals with the microbial infused hulls or shells (16)
- Microbes reaches gastrointestinal tract alive (18)
- Germinate in upper digestive tract (20)
- Stimulate local intestinal immunity with the microbes (22)

Different carriers can be used. Beside hulls, the feed can use wheat or corn powder for carrier. Dendritic salt and grind up limestone or calcium carbonate can be used as well. The purpose of using salt as a carrier is to help the animal restore electrolytes in the body. This problem is often caused by extreme heat in the summer, mineral deficiency in winter and after severe diarrhea. The salt will not only help retain water, electrolytes in the body, but also increases appetite. Wheat, hull, corn carriers provide more nutrients in the diet but should be used when the animal is healthy during a normal growing cycle. For example, grazing animals, the feed includes hull, wheat, and dendritic salt for the carrier, depending on the season. For poultry, the feed includes dendritic salt or calcium carbonate. For aquatic fish and other creatures, dendritic salt is used. For swine, the feed can include dendritic salt or calcium carbonate.

In one embodiment called PROBIOFEED, the solution contains several strains of *bacillus* spp to ensure a broad spectrum product that can work in wide variety of environmental applications. The *Bacillus* spp germinates in upper digestive tract and display their activity in those sections of intestine which are relevant for nutrient absorption. *Bacillus* is selected as a sporulated living microorganism with the ability to form spores. They reach the gastrointestinal tract alive and stimulates local intestinal immunity.

Various cell walls that protect the nucleus from external stresses enable the *Bacillus* products to withstand massive stress during feed production and storage caused by 1) High temperature, 2) Pressure, 3) Shear forces, and 4) Oxidation impacts. In some embodiments, selected cell walls are used as a protective structure/mechanism for producing the *Bacillus* included products.

Figure 2B:
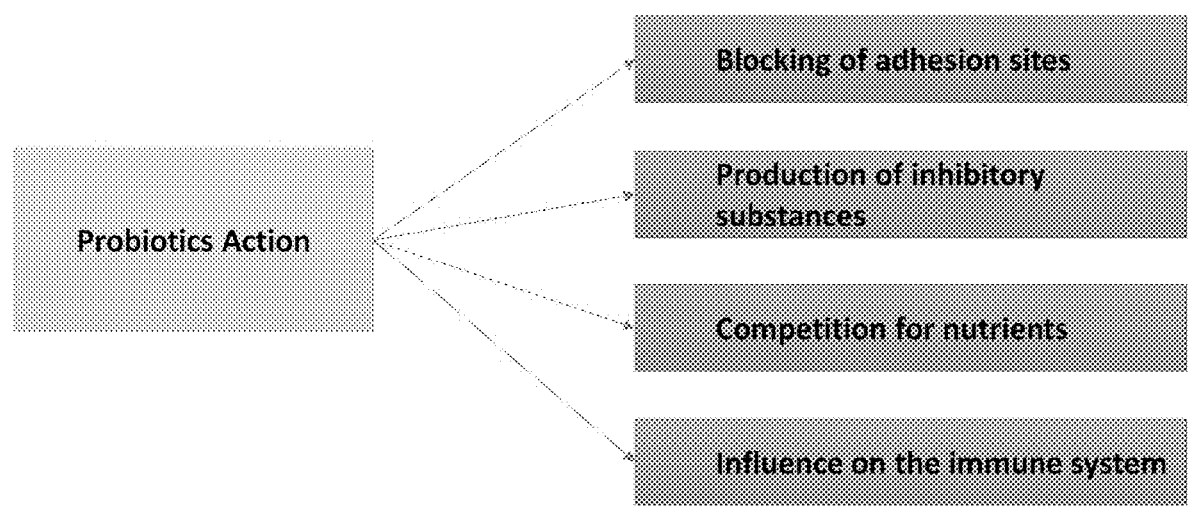
FIG. 2B shows exemplary probiotics actions.

FIG. 2A shows an exemplary digestive tract with nutrients, non-beneficial bacteria, lactobacilli and probiotics. As detailed in FIG. 2B, probiotics actions include: blocking of adhesion sites, production of inhibitory substances, competition for nutrients, and influencing the immunity system. The benefits include improved digestibility of nutrients and detoxification of toxic molecules and improved vitamin synthesis (B and K). This provides an environmental friendly animal husbandry.

The probiotics provide antagonistic action against non-desirable microorganisms (barrier effect) and protects the intestinal mucous membrane against invading microorganisms. They contribute to maturation and stimulation of the host's immune system; improve growth and survivability of the animal; and reduce feed cost. The probiotics also improve feed conversion (FCR), decrease by 1%-5% and improves daily weight gain (DWG), increase by 3%-5%. Yet other benefits include one or more of the following:

- Increased production and survivability
- Reduced risk of digestive problems
- Improved nutrients absorption
- Uniform growth and better homogeneity of the groups
- Reduced fattening period
- Reduced feed expenditure
- Reduced medication costs
- Reduced slurry nutrient content (lower nitrogen excretion for example)

Next, exemplary results on probiotics on the performance of animals are shown as follows:

Influence of Various Probiotics on the Performance of Animals

| Production branch | DWG (% of control) | FCR (% of control) |
|---|---|---|
| Piglet production | +4.8 | −1.5 |
| | (−8.1 to +24.3) | (+3.1 to −9.3) |
| Calf production | +5.4 | −2.5 |
| | (−5.3 to +21.7) | (+3.6 to −7.9) |
| Growing/fattening pigs | +3.7 | −5.1 |
| | (−0.3 to +6.7) | (−1.4 to −7.1) |
| Growing/fattening cattle | +3.4 | −2.7 |
| | (−4.3 to +7.2) | (+7.6 to −4.7) |

Influence of Probiotics on Protein Digestibility and Crude Protein Deposition in Piglets

| Nitrogen digestibility (%) | | Nitrogen deposition (g $W^{-0.75}$ per day)[1] | | |
|---|---|---|---|---|
| Control | Probiotic** | Control | Probiotic** | Authors |
| 81.05$^a$ | 82.86$^b$ | 1.24$^a$ | 1.34$^b$ | SE Scheuermann, 1993 |
| 78.70$^c$ | 83.20$^c$ | 1.76 | 1.81 | Tossenberger et al., 1995 |

[1]Relative to metabolic body weight
**dosage 1 × 10$^9$ CFU per kg of piglet feed
$^{a, b, c, d}$significant differences To feed the animals, in various embodiments:
For feed blending as a pre-mixed or coating: about 0.5 gram per kilogram of feed
For per feed mixing (can be mixed to one meal per day): about 2 grams per kilogram of feed
For drinking dosage: about 2 grams per liter of water.

The microbes used for animal nutrition have a very good safety record. Even in cases of overdoses of more than thousand times recommended levels in feed, there're no signs of dysbiosis in the gastrointestinal tract. Probiotics do not constitute any health hazard for animal. Since they are not transferred from intestine into the body of animal, probiotics do not affect any metabolic processes, nor do they have any negative impact on the animal.

Figure 3:
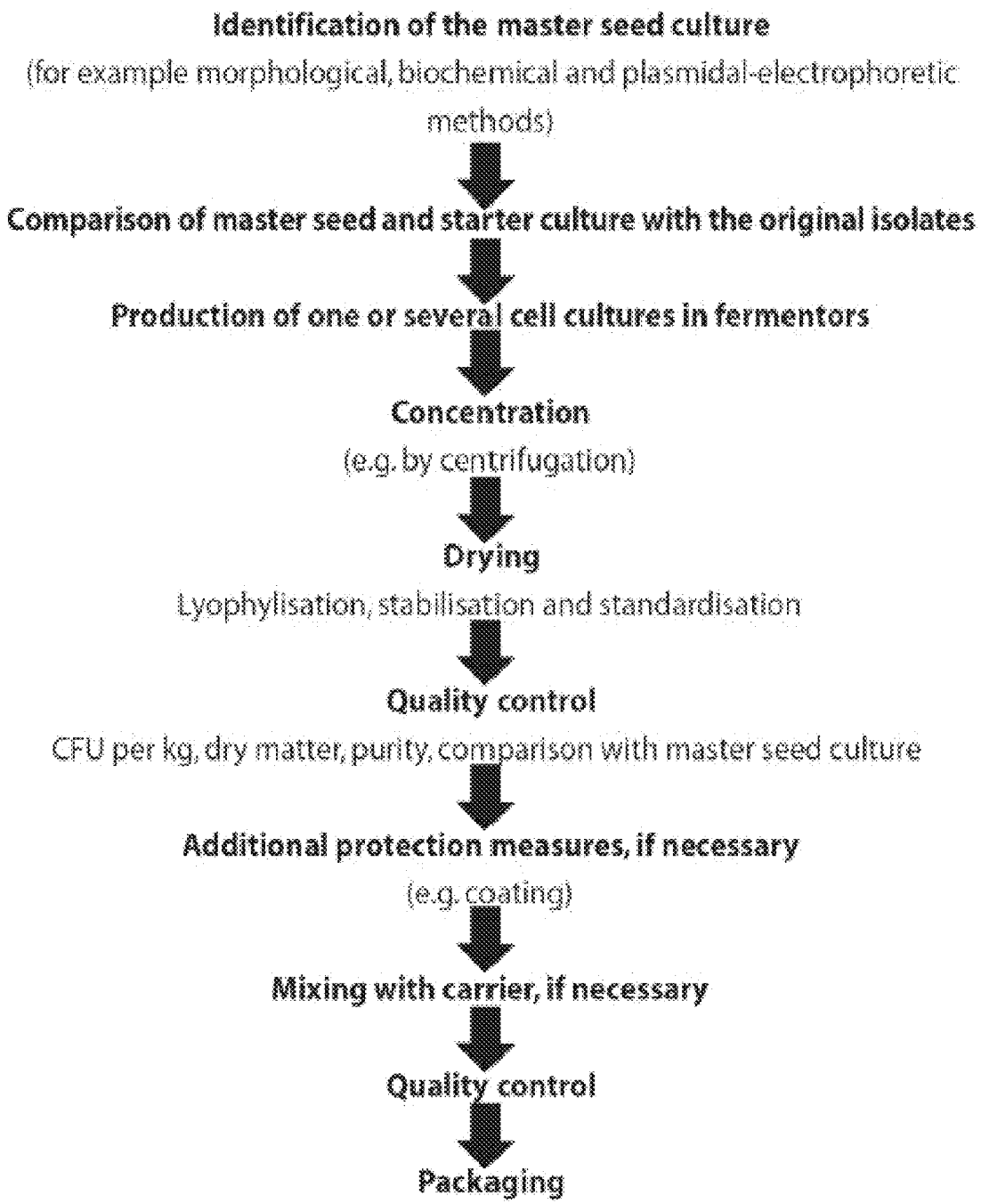
FIG. 3 shows an exemplary process to form PROBIOFEED.

FIG. 3 shows an exemplary process to form PROBIOFEED. First, the master seed culture is identified. Next, the process compares the master seed and starter culture with the original isolates. One or more cell cultures are produced in fermenters, and the result can be concentrated by centrifugation, among others. The concentrated cell cultures can be dried using lyophilisation, stabilization, and standardization techniques. Quality control is then done and the result can be compared with the master seed culture. Additional protection measures can be applied, such as coating the dried cell cultures. The result can be mixed with a carrier if necessary, and then quality control can be done. The resulting PROBIOFEED composition can be packaged for shipping. PRO BIOFEED Final Packaging can include Bags/Buckets/Drums, among others.

Various exemplary microbial compositions are detailed next.

Example 1

Microbes:
Bacillus pumilus $4.05 \times 10^8$ CFU/g
Bacillus subtilis $6.30 \times 10^8$ CFU/g
Bacillus amyloliquefaciens $5.85 \times 10^8$ CFU/g
Bacillus lichniformis $1.80 \times 10^8$ CFU/g
Amino Acids: Amino Acids
Dendritic Salt: Sodium Chloride Example 2

Microbes:
Bacillus licheniformis $2.28 \times 10^9$ CFU/g
Bacillus subtilis $2.28 \times 10^9$ CFU/g
Dendritic Salt: Sodium Chloride Example 3

Microbes:
Bacillus licheniformis $4.762 \times 10^9$ CFU/g
Amino Acids: Amino Acids
Ground Lime Stone: Calcium Carbonate Example 4

Microbes:
Bacillus licheniformis $2.28 \times 10^9$ CFU/g
Bacillus subtilis $2.28 \times 10^9$ CFU/g
Almond Hull: Ground Almond Hull Example 5

Microbes:
Bacillus licheniformis $4.762 \times 10^9$ CFU/g
Amino Acids: Amino Acids
Dendritic Salt: Sodium Chloride Example 6

Microbes:
Bacillus Subtilis $4.762 \times 10^9$ CFU/g
Amino Acids: Amino Acids
Dendritic Salt: Sodium Chloride The above description is for the purpose of illustrating and not limiting the present invention, and teaching the person of ordinary skill in the art how to practice the invention. It is not intended to detail all those obvious modifications and variations of it which will become apparent to the skilled worker upon reading the description. It is intended, however, that all such obvious modifications and variations be included within the scope of the present invention as defined in the appended claims. The claims are meant to cover the claimed components and steps in any sequence which is effective to meet the objectives there intended, unless the context specifically indicates the contrary.

The patents, papers, and book excerpts cited above are hereby incorporated herein by reference in in their entireties.

What is claimed is:

1. A method for feeding animals, comprising:
selecting a plurality of strains of sporulated living *Bacillus* species to form a microbial solution comprising:
iteratively and selectively breeding generations of the *Bacillus* species for strain selection having predetermined microbial gene profiles and forming said microbial solution in a highly concentrated form, wherein multiple *Bacillus* species are separately cultivated and followed with cross cultivation in a specific sequence;
selecting as a carrier for a predetermined animal:
for grazing animal, one of hull, wheat, and dendritic salt,
for poultry, dendritic salt or calcium carbonate,
for aquatic animal, dendritic salt,
for swine, dendritic salt or calcium carbonate,
applying the microbial solution to the carrier to provide a microbial infused carrier; and
performing feed blending between 0.01 to 1 gram said microbial infused carrier per kilogram of feed as a pre-mixed feed or coating for feeding said predetermined animal.

2. The method of claim 1, comprising feeding animals with the blended microbial infused carrier to deliver microbes to a gastrointestinal tract alive.

3. The method of claim 2, comprising germinating the microbes in a digestive tract and stimulating local intestinal immunity with the microbes.

4. The method of claim 1, comprising selecting the microbe from *Bacillus (B.) acidiceler, B. acidicola, B. acidiproducens, B. acidocaldarius, B. acidoterrestrisr, B. aeolius, B. aerius, B. aerophilus, B. agaradhaerens, B. agri, B. aidingensis, B. akibai, B. alcalophilus, B. algicola, B. alginolyticus, B. alkalidiazotrophicus, B. alkalinitrilicus, B. alkalisediminis, B. alkalitelluris, B. altitudinis, B. alveayuensis, B. alvei, B. amyloliquefaciens, B. a.* subsp. *amyloliquefaciens, B. a.* subsp. *plantarum, B. amylolyticus, B. andreesenii, B. aneurinilyticus, B. anthracis, B. aquimaris, B. arenosi, B. arseniciselenatis, B. arsenicus, B. aurantiacus, B. arvi, B. aryabhattai, B. asahii, B. atrophaeus, B. axarquiensis, B. azotofixans, B. azotoformans, B. badius, B. barbaricus, B. bataviensis, B. beijingensis, B. benzoevorans, B. beringensis, B. berkeleyi, B. beveridgei, B.* bogoriensis, B. boroniphilus, B. borstelensis, B. brevis Migula, B. butanolivorans, B. canaveralius, B. carboniphilus, B. cecembensis, B. cellulosilyticus, B. centrosporus, B. cereus, B. chagannorensis, B. chitinolyticus, B. chondroitinus, B. choshinensis, B. chungangensis, B. cibi, B. circulans, B. clarkii, B. clausii, B. coagulans, B. coahuilensis, B. cohnii, B. composti, B. curdlanolyticus, B. cycloheptanicus, B. cytotoxicus, B. daliensis, B. decisifrondis, B. decolorationis, B. deserti, B. dipsosauri, B. drentensis, B. edaphicus, B. ehimensis, B. eiseniae, B. enclensis, B. endophyticus, B. endoradicis, B. farraginis, B. fastidiosus, B. fengqiuensis, B. firmus, B. flexus, B. foraminis, B. fordii, B. formosus, B. fortis, B. fumarioli, B. funiculus, B. fusiformis, B. galactophilus, B. galactosidilyticus, B. galliciensis, B. gelatini, B. gibsonii, B. ginsengi, B. ginsengihumi, B. ginsengisoli, B. globisporus, B. g. subsp. globisporus, B. g. subsp. marinus, B. glucanolyticus, B. gordonae, B. gottheilii, B. graminis, B. halmapalus, B. haloalkaliphilus, B. halochares, B. halodenitrificans, B. halodurans, B. halophilus, B. halosaccharovorans, B. hemicellulosilyticus, B. hemicentroti, B. herbersteinensis, B. horikoshii, B. horneckiae, B. horti, B. huizhouensis, B. humi, B. hwajinpoensis, B. idriensis, B. indicus, B. infantis, B. infernus, B. insolitus, B. invictae, B. iranensis, B. isabeliae, B. isronensis, B. jeotgali, B. kaustophilus, B. kobensis, B. kochii, B. kokeshiiformis, B. koreensis, B. korlensis, B. kribbensis, B. krulwichiae, B. laevolacticus, B. larvae, B. laterosporus, B. lautus, B. lehensis, B. lentimorbus, B. lentus, B. licheniformis, B. ligniniphilus, B. litoralis, B. locisalis, B. luciferensis, B. luteolus, B. luteus, B. macauensis, B. macerans, B. macquariensis, B. macyae, B. malacitensis, B. mannanilyticus, B. marisflavi, B. marismortui, B. marmarensis, B. massiliensis, B. megaterium, B. mesonae, B. methanolicus, B. methylotrophicus, B. migulanus, B. mojavensis, B. mucilaginosus, B. muralis, B. murimartini, B. mycoides, B. naganoensis, B. nanhaiensis, B. nanhaiisediminis, B. nealsonii, B. neidei, B. neizhouensis, B. niabensis, B. niacini, B. novalis, B. oceanisediminis, B. odysseyi, B. okhensis, B. okuhidensis, B. oleronius, B. oryzaecorticis, B. oshimensis, B. pabuli, B. pakistanensis, B. pallidus, B. pallidus, B. panacisoli, B. panaciterrae, B. pantothenticus, B. parabrevis, B. paraflexus, B. pasteurii, B. patagoniensis, B. peoriae, B. persepolensis, B. persicus, B. pervagus, B. plakortidis, B. pocheonensis, B. polygoni, B. polymyxa, B. popilliae, B. pseudalcalophilus, B. pseudofirmus, B. pseudomycoides, B. psychrodurans, B. psychrophilus, B. psychrosaccharolyticus, B. psychrotolerans, B. pulvifaciens, B. pumilus, B. purgationiresistens, B. pycnus, B. qingdaonensis, B. qingshengii, B. reuszeri, B. rhizosphaerae, B. rigui, B. ruris, B. safensis, B. salarius, B. salexigens, B. saliphilus, B. schlegelii, B. sediminis, B. selenatarsenatis, B. selenitireducens, B. seohaeanensis, B. shacheensis, B. shackletonii, B. siamensis, B. silvestris, B. simplex, B. siralis, B. smithii, B. soli, B. solimangrovi, B. solisalsi, B. songklensis, B. sonorensis, B. sphaericus, B. sporothermodurans, B. stearothermophilus, B. stratosphericus, B. subterraneus, B. subtilis, B. s. subsp. inaquosorum, B. s. subsp. spizizenii, B. s. subsp. subtilis, B. taeanensis, B. tequilensis, B. thermantarcticus, B. thermoaerophilus, B. thermoamylovorans, B. thermocatenulatus, B. thermocloacae, B. thermocopriae, B. thermodenitrificans, B. thermoglucosidasius, B. thermolactis, B. thermoleovorans, B. thermophilus, B. thermoruber, B. thermosphaericus, B. thiaminolyticus, B. thioparans, B. thuringiensis, B. tianshenii, B. trypoxylicola, B. tusciae, B. validus, B. vallismortis, B. vedderi, B. velezensis, B. vietnamensis, B. vireti, B. vulcani, B. wakoensis, B. weihenstephanensis, B. xiamenensis, B. xiaoxiensis, and B. zhanjiangensis.

5. The method of claim 1, comprising germinating in an upper digestive tract and acting on predetermined sections of an intestine for nutrient absorption.

6. The method of claim 1, wherein the hull comprises corn or almond hull.

7. A method for feeding animals, comprising: selecting a plurality of strains of sporulated living *Bacillus* species to form a microbial solution comprising: iteratively and selectively breeding generations of the *Bacillus* species for strain selection having predetermined microbial gene profiles and forming said microbial solution in a highly concentrated form, wherein multiple *Bacillus* species are separately cultivated and followed with cross cultivation in a specific sequence;
selecting as a carrier for a predetermined animal:
for grazing animal, one of hull, wheat, and dendritic salt,
for poultry, dendritic salt or calcium carbonate,
for aquatic animal, dendritic salt,
for swine, dendritic salt or calcium carbonate,
applying the microbial solution to the carrier to provide a microbial infused carrier; and
performing feed blending between 0.01 to 5 gram of said microbial infused carrier per kilogram of feed as a pre-mixed feed or coating for feeding said predetermined animal.

8. A method for feeding animals, comprising: selecting a plurality of strains of sporulated living *Bacillus* species to form a microbial solution comprising: iteratively and selectively breeding generations of the *Bacillus* species for strain selection having predetermined microbial gene profiles and forming said microbial solution in a highly concentrated form, wherein multiple *Bacillus* species are separately cultivated and followed with cross cultivation in a specific sequence;
selecting as a carrier for a predetermined animal:
for grazing animal, one of hull, wheat, and dendritic salt,
for poultry, dendritic salt or calcium carbonate,
for aquatic animal, dendritic salt,
for swine, dendritic salt or calcium carbonate,
applying the microbial solution to the carrier to provide a microbial infused carrier; and
mixing between 0.01 to 5 gram of said microbial infused carrier per liter of water as a drink for said predetermined animal.

\* \* \* \* \*